United States Patent [19]
Strolle et al.

[11] Patent Number: 5,635,995
[45] Date of Patent: Jun. 3, 1997

[54] DUAL CHROMINANCE SIGNAL PROCESSOR FOR COMBINED TV/VCR SYSTEMS

[75] Inventors: Christopher H. Strolle, Glenside, Pa.; Steven T. Jaffe, Freehold, N.J.

[73] Assignee: David Sarnoff Research Center, Inc., Princeton, N.J.

[21] Appl. No.: 472,835

[22] Filed: Jun. 7, 1995

[51] Int. Cl.$^6$ .................... H04N 9/79; H04N 9/80; H04N 5/92
[52] U.S. Cl. .................... 348/727; 348/638; 348/724; 386/1; 386/46
[58] Field of Search .................... 348/724, 726, 348/727, 638, 554, 555; 358/335, 330, 310, 328; H04N 9/09, 9/79, 9/80, 5/92, 5/921, 5/922

[56] References Cited

U.S. PATENT DOCUMENTS 4,977,455  12/1990  Young .................... 358/142
5,083,197  1/1992  Ko et al. .................... 358/19
5,351,089  9/1994  Matsumoto et al. .................... 348/638
5,355,162  10/1994  Yazolino et al. .................... 348/555

Primary Examiner—Glenton B. Burgess
Attorney, Agent, or Firm—William J. Burke

[57] ABSTRACT

A dual chrominance signal processor is disclosed which may be used in a combination television and video cassette recorder system, for example. Such a chrominance signal processor includes first and second modulated chrominance signal sources, and first and second demodulating carrier signal sources, corresponding to the first and second modulated chrominance signal sources, respectively. A demodulator is responsive to a chrominance signal and a demodulating carrier signal, for demodulating the chrominance signal. A signal selector is coupled between the signal sources and the demodulator, and selectively couples one of the first and second chrominance signal sources, and the corresponding one of the first and second demodulating carrier signal sources, to the demodulator in response to a selection signal.

9 Claims, 3 Drawing Sheets

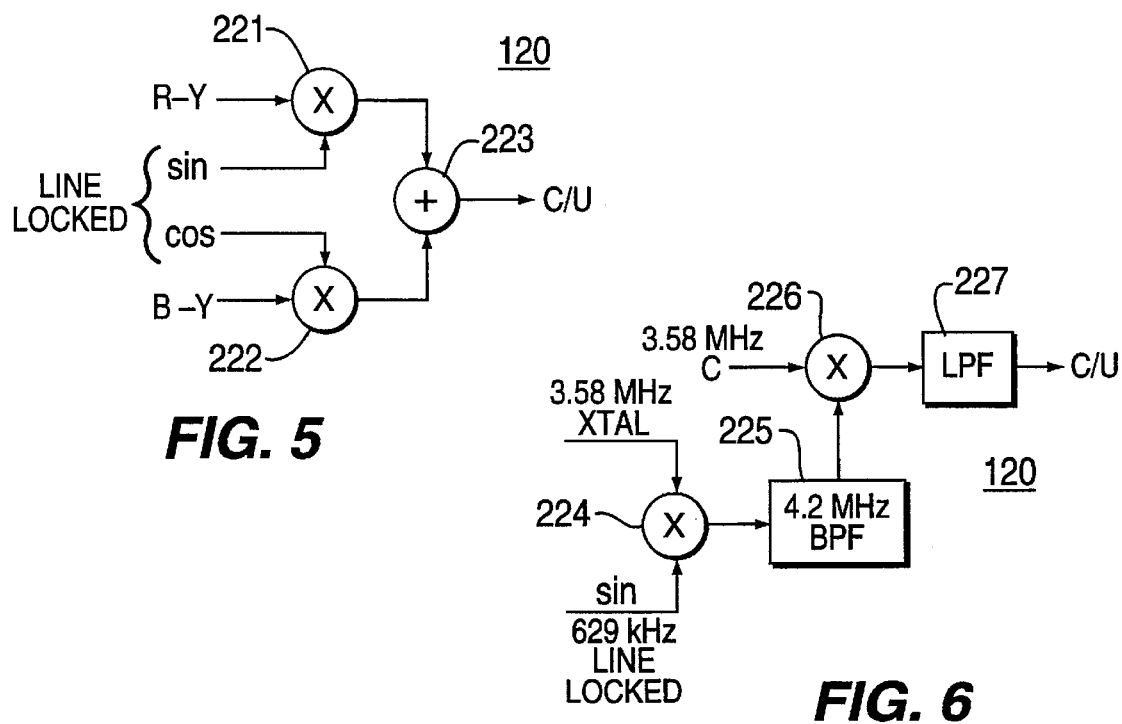
FIG. 5
FIG. 6
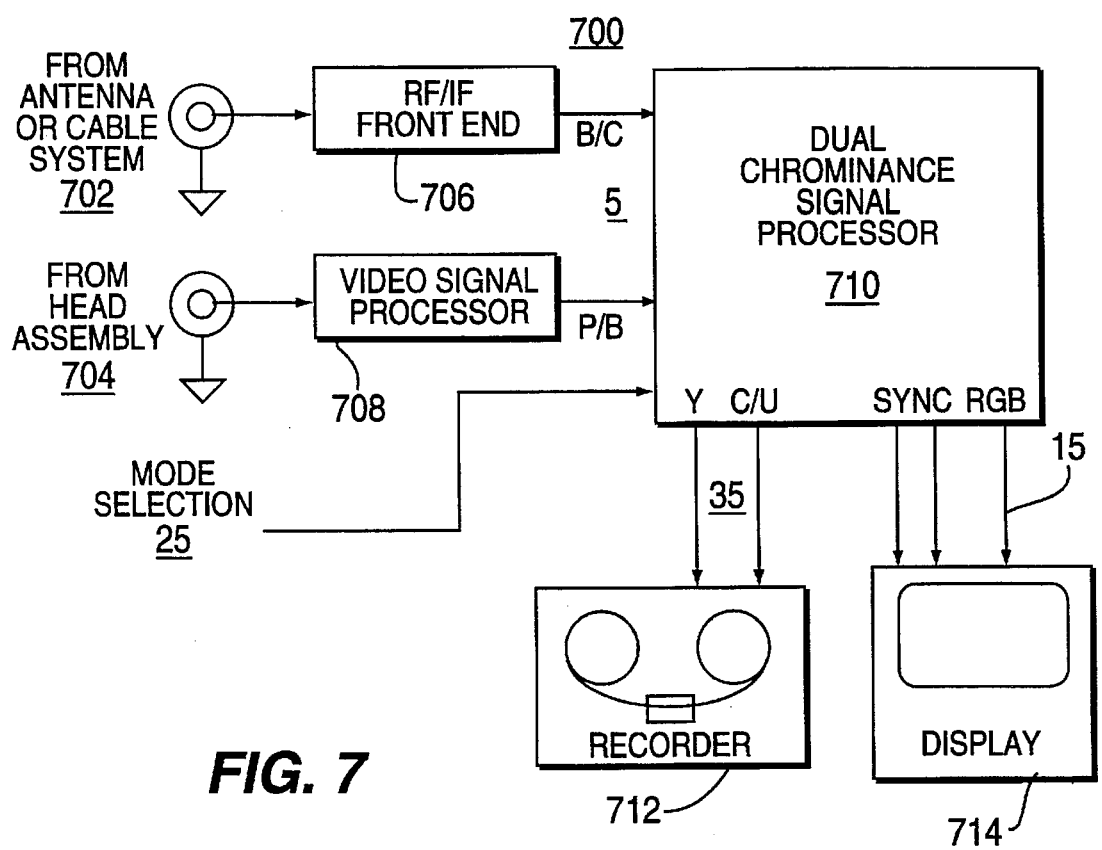
FIG. 7

DUAL CHROMINANCE SIGNAL PROCESSOR FOR COMBINED TV/VCR SYSTEMS

The invention relates to circuitry in a combined television receiver and video cassette recorder (TV/VCR) system for processing the chrominance signal from either a broadcast television signal source, or the VCR playback signal source.

BACKGROUND

A combination of a television (TV) receiver and a video cassette recorder (VCR) provides a consumer with a useful combination of functions in a single piece of electronic equipment. Using a TV/VCR combination, a viewer can watch a television program from either a pre-recorded video cassette tape, or from a broadcast or cable station. In addition, a viewer may record a received broadcast or cable television program on a video cassette tape.

Current TV/VCRs have simply combined the circuitry found in a VCR with that found in a TV receiver. For example, in an NTSC TV receiver, there is a chrominance signal processor for processing the quadrature modulated chrominance component, modulated on a 3.58 MHz color subcarrier, in the received composite television signal. This chrominance signal processor includes a quadrature demodulator having a pair of in-phase and quadrature mixers responsive to the chrominance signal and to a pair of in-phase and quadrature demodulating carrier signals. The carrier signals are produced by a crystal oscillator operating at 3.58 MHz and phase controlled by the color burst signal. The signals from the pair of mixers is then processed by a corresponding pair of low pass filters (LPFs). The output signals from the LPFs are respective color difference signals R-Y and B-Y. A phase locked loop, responsive to the color burst signal, controls the phase of the pair of quadrature demodulating carrier signals.

In a VHS VCR, however, the color-under signal, when recorded and played-back, is modulated on a line-locked 629 kHz carrier signal whose phase is varied by 90 degrees from line to line, called a 4-phase carrier signal in the remainder of this description. During playback, this color-under signal is never demodulated in the VCR. Instead, the VCR contains an up-converter, for changing the center frequency of this 629 kHz color-under signal to 3.58 MHz, to produce an NTSC TV-type chrominance signal. This chrominance signal is then combined with the played-back luminance signal to form an NTSC composite video signal which can be processed by a standard TV receiver as described above.

In present TV/VCRs, the VCR section contains essentially the same circuitry as in a standalone VCR, and the TV section contains essentially the same circuitry as a standalone TV, including the color-under and chrominance circuits described above. The redundant chrominance processing circuitry in current TV/VCRs leads to increased costs to manufacture due to the cost of the redundant parts and the added manufacturing steps necessary to fabricate and install the redundant parts. In addition, reliability of current TV/VCRs is reduced due to the possibility of failure of the redundant parts. A TV/VCR which eliminates the need for redundant parts is desirable to lower cost and increase reliability.

SUMMARY OF THE INVENTION

The disadvantages heretofore associated with the prior art are overcome by a dual chrominance signal processor of the present invention. the dual chrominance signal processor selectively processes a plurality of chrominance signals having differing signal formats. For example, the inventive processor processes both television (TV) chrominance signals and video cassette recorder (VCR) chrominance signals. As such, the invention finds use in a combined TV/VCR system, where the TV chrominance signal must be processed for display as well as converted to VCR chrominance signal for recording and the VCR chrominance signal must be processed for display on the TV.

Specifically, the dual chrominance signal processor contains a direct chrominance converter (DCC) that converts any format chrominance signal (c) into color difference signals (B-Y) and (R-Y). The DCC contains a quadrature demodulator, a DCC timing signal generator, and a plurality of switching circuits (multiplexers) for selectively routing signals within the DCC. Optionally, the DCC contains a color under chrominance signal generator for converting color difference signals into VCR format chrominance signals.

In operation, the DCC timing signal generator produces a plurality of quadrature carrier signals (I- and Q-phase signals). Using the TV/VCR example, the carrier signals are 3.58 MHz and 629 kHz. A multiplexer selectively couples either frequency quadrature carrier signal to the quadrature demodulator. The frequency selection is performed in response to the operational mode of the system in which the DCC is used, e.g., TV mode or VCR mode in a TV/VCR system. An input multiplexer couples the appropriate chrominance signal (e.g., either the TV or VCR chrominance signal) to the quadrature demodulator. When a TV chrominance signal is coupled to the quadrature demodulator, the 3.58 MHz signal is also coupled to the demodulator. Similarly, when a VCR chrominance signal is coupled to the demodulator, the 629 kHz signal is also coupled to the demodulator. As such, for either signal format, color difference signals are produced.

IN THE DRAWING

FIG. 5 is a block diagram of a color-under signal generator for use in a record mode of a TV/VCR of the invention;

FIG. 6 is a block diagram of another embodiment of a color-under signal generator for use in the record mode of a TV/VCR of the invention; and FIG. 7 depicts a high level block diagram of an illustrative TV/VCR system.

DETAILED DESCRIPTION

Figure 1:
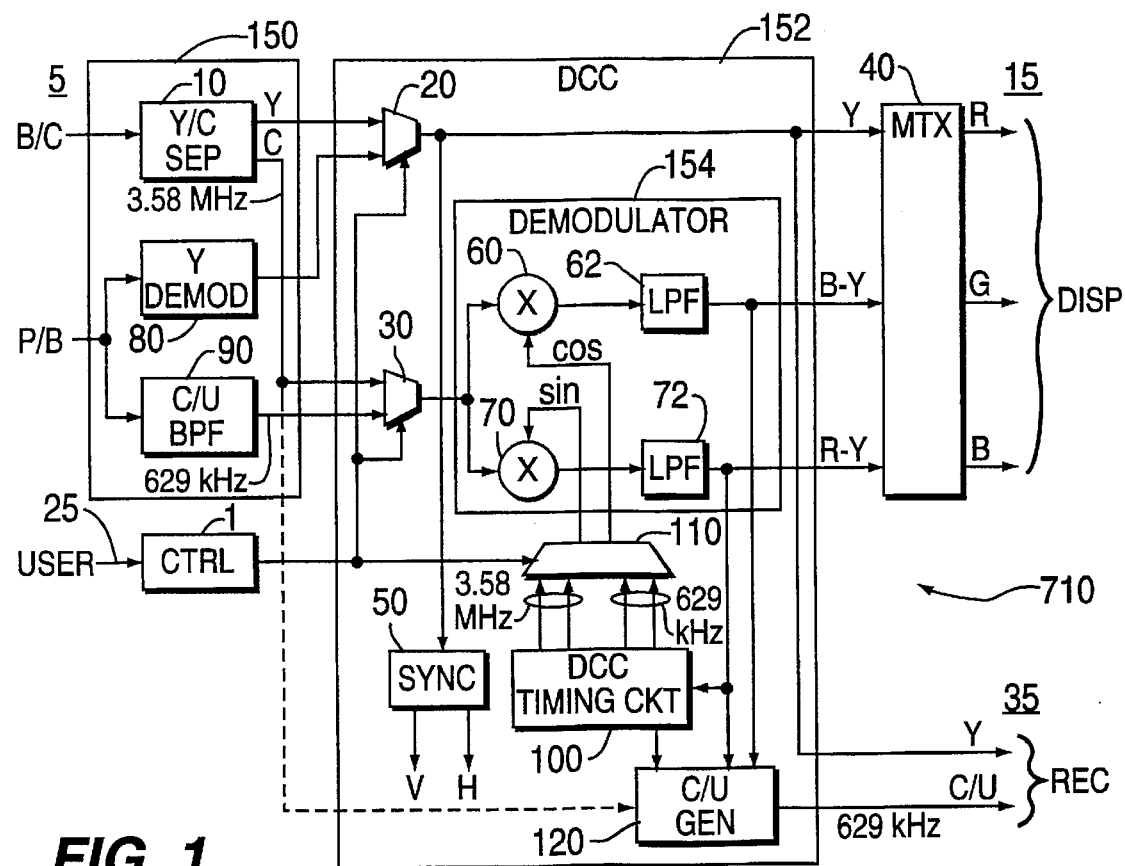
FIG. 1 is a block diagram of a portion of a combination of a television and a video cassette recorder illustrating a dual chrominance signal processor of the invention.

FIG. 7 depicts a high-level block diagram of a combined television/video cassette recorder (TV/VCR) system 700 in which the present invention of a dual chrominance signal processor finds use. The system 700 comprises a first input port 702 coupled to a signal containing a first chrominance signal such as an antenna, cable system or other TV signal source, a second input port 704 coupled to a signal containing a second chrominance signal such as a VCR head assembly, an RF/IF front end 706, a video signal processor 708, a dual chrominance signal processor 710, VCR recording circuitry 712, a video display 714, and a mode selection port 25.

The RF/IF front end 706 conventionally contains a tuner, filters, amplifiers and the like, which select, from signals at the first input port 702, a channel for reception and down-converts that channel to baseband or near baseband. This baseband (near baseband) signal is referred to herein as the broadcast composite video signal (B/C).

The video signal processor conventionally contains amplifiers, filters and the like for producing, from signals at the second input port 704 a video cassette playback composite video signal (referred to herein as the P/B composite signal).

The B/C and P/B signals on paths 5 are connected to the dual chrominance signal processor 710. From either the B/C or P/B signals, the processor 710 generates conventional Red-Green-Blue (RGB) signals on path 15 for use by video display 714. Of course RGB is an illustrative signal format, the system could use any video signal format. In addition, the processor 710 optionally produces luminance (Y) and color under (C/U) signals on path 35. These signals are derived from the B/C and P/B signals and form a signal format that is used by a recording portion 712 of a VCR to record video signals.

Lastly, the dual chrominance signal processor 710 receives mode selection signals on port 25. Generally, these signals are produced via front panel switches of the TV/VCR system 700. The switches are user manipulated to place the system in either TV or VCR mode. When in TV mode, the dual chrominance processor 710 processes the B/C signals and, when in VCR mode, the processor 710 processes the P/B signals.

FIG. 1 is a block diagram of the dual chrominance signal processor of the invention. In FIG. 1, the pair 5 of composite video signal input terminals is coupled to respective sources of composite video signals. A first composite video signal input terminal of the pair 5 is coupled to the source of a broadcast (B/C) or cable composite video signal or other known television signal (e.g., the RF/IF front end 706 of FIG. 7). The front end produces the composite video signal (B/C) in a known format, for example in the NTSC format in the United States, in a known manner. In the broadcast format, the chrominance component is quadrature modulated on a subcarrier which co-occupies the upper end of the frequency spectrum of composite video signal. Specifically, in the NTSC format, the chrominance signal is quadrature modulated on a 3.58 MHz subcarrier, which lies at the upper end of the 4.5 MHz bandwidth of the baseband composite video signal.

The second composite video signal (P/B) input terminal of the pair 5 is coupled to the source of a video cassette playback (P/B) composite video signal (e.g., video signal processor 708 of FIG. 7). The P/B signal source produces a composite video signal in a known color-under format, for example in the VHS format, in a known manner. In the color-under format, the chrominance signal is 4-phase quadrature modulated to occupy a lower frequency band than the FM modulated luminance and FM modulated hi-fi sound components of the composite video signal. Specifically, in the VHS format, the chrominance component is 4-phase quadrature modulated on a 629 kHz carrier, while the luminance component is FM modulated on a 3.4 MHz carrier.

The dual chrominance signal processor 710 contains a signal preprocessor, 150, a direct chrominance converter (DCC) 152, and a color signal matrix 40. The signal preprocessor 150 processes the B/C and P/B signals to separate the luminance (Y) and chrominance (C or C/U) signals therefrom. The separate luminance signal is then utilized by the DCC 152 to generate timing and synchronization signals that are, in turn, used by the DCC to process the chrominance signals. The DCC converts either type of chrominance signal, i.e., TV chrominance (C) or VCR chrominance (C/U), into color difference signals (B-Y) and (R-Y). The color signal matrix 40 then maps the luminance and color difference signals into a conventional video signal format such as RGB. Optionally, using the input signals to the color signal matrix 40, the DCC 152 also generates a luminance and color under signal for output to the recording portion of a VCR.

Specifically, within the preprocessor 150, the B/C input terminal 5 is coupled to an input terminal of a luminance (Y)/chrominance (C) separator 10. A luminance signal output terminal Y of the Y/C separator 10 is coupled to a first input terminal of a first multiplexer 20 within the DCC 152, and a chrominance signal output terminal C is coupled to a first input terminal of a second multiplexer 30 within the DCC 152. An output terminal of the first multiplexer 20 is coupled to a first input terminal of a color signal matrix 40, a synchronization signal separator 50 and a luminance signal Y record output terminal 35. An output terminal of the second multiplexer 30 is coupled to respective input terminals of a quadrature demodulator 154. The demodulator contains two mixers 60 and 70 and two low pass filters 62 and 72. In particular, the output of second multiplexer 30 is coupled to both the first and second mixers 60 and 70 of the quadrature demodulator 154. An output terminal of the first mixer 60 is coupled to an input terminal of a first low pass filter (LPF) 62. An output terminal of the first LPF 62 produces a first color difference signal B-Y, and is coupled to a second input terminal of the color matrix 40 and a first input terminal of a color-under (C/U) signal generator 120. An output terminal of the second mixer 70 is coupled to an input terminal of a second LPF 72. An output terminal of the second LPF 72 produces a second color difference signal R-Y, and is coupled to a third input terminal of the color matrix 40, a first input terminal of a direct chrominance converter (DCC) timing circuit 100, and a second input terminal of the C/U signal generator 120. The P/B input terminal 5 is coupled to respective input terminals of a luminance component (Y) demodulator 80 and a color-under component (C/U) band pass filter 90 (BPF). An output terminal of the Y demodulator 80 is coupled to a second input terminal of the first multiplexer 20, and an output terminal of the C/U BPF 90 is coupled to a second input terminal of the second multiplexer 30. As such, multiplexers 20 and 30 form switches that select an appropriate luminance or chrominance signal for processing. The selection depends on the operational mode of the system.

Respective output terminals of the sync separator 50 produce a vertical sync signal (V) and a horizontal sync signal (H) which are supplied to deflection circuitry for the television display (not shown). In addition, a third output terminal of the sync separator 50 supplies timing signals (to be described below) to a second input terminal of the DCC timing circuit 100. A first pair of output terminals of the DCC timing circuit 100 produces quadrature demodulating carrier signals at a nominal frequency of 3.58 MHz (the B/C chrominance subcarrier frequency). The first pair of output terminals of the DCC timing circuit 100 is coupled to a first pair of input terminals of a 2-input third multiplexer 110. A second pair of output terminals of the DCC timing circuit 100 produces 4-phase quadrature demodulating carrier signals at a nominal frequency of 629 kHz (the color-under carrier frequency). The second pair of output terminals of the DCC timing circuit 100 is coupled to a second pair of input terminals of the third multiplexer 110. A pair of output terminals of the third multiplexer 110 is coupled to respective second input terminals of the first and second mixers 60 and 70. A further output terminal of the DCC timing circuit 100 is coupled to a third input terminal of the C/U signal generator 120. An output terminal of the C/U signal generator 120 is coupled to a color-under C/U record output terminal 35.

A user input terminal 25 receives a control signal from a user control device (not shown), which may be control switches located on the TV/VCR enclosure, and/or a remote control unit. The user control signals are processed by a user control circuit 1. The user control circuit 1 supplies a control signal to respective control input terminals of the first, second, and third multiplexers 20, 30, and 110.

First, second and third output terminals 15 of the color signal matrix 40 produce red (R), green (G), and blue (B) color representative signals. These signals are supplied to a known color image display device (not shown), such as a color kinescope. The luminance Y and color-under C/U record output terminals 35 are supplied to a known VCR record circuit (not shown) including FM modulators, record amplifiers, record head(s) and/or other circuit elements.

In operation, the RF/IF front end produces an NTSC format composite video signal in which the chrominance signal is quadrature modulated on a 3.58 MHz subcarrier, as described above. The B/C Y/C separator 10 operates in a known manner on the received broadcast video signal to separate the quadrature modulated chrominance signal C from the baseband luminance signal Y. Similarly, the playback video signal source (not shown) produces a VHS format composite video signal in which the color-under signal is 4-phase quadrature modulated on a 629 kHz carrier, as described above. When the VCR is placed in the playback mode, the luminance demodulator 80 operates in a known manner on the reproduced playback video signal to demodulate the baseband luminance signal Y and the C/U BPF 90 operates in a known manner to extract the 4-phase quadrature modulated color-under signal C/U from the playback video signal.

A user may elect to watch an image representing a received broadcast television video signal on the display device, to watch an image representing the playback video signal from a previously recorded video cassette tape on the display device, or to record a received video signal from the broadcast video signal source onto a video cassette tape, e.g., for future viewing. If the user elects to watch an image representing a received broadcast video signal, the user control circuit 1 conditions the first multiplexer 20 to couple the luminance signal Y from the B/C Y/C separator 10 to its output terminal, conditions the second multiplexer 30 to couple the chrominance signal C from the B/C Y/C separator 10 to its output terminal, and conditions the third multiplexer to couple the 3.58 MHz quadrature demodulating carrier signals to quadrature demodulator 154.

In this configuration, the NTSC chrominance signal C, quadrature modulated on a 3.58 MHz subcarrier, and the corresponding 3.58 MHz quadrature demodulating carrier signals, are supplied to respective input terminals of the first and second mixers 60 and 70 in the demodulator 154. The DCC timing circuit 100 maintains the frequency and phase of the 3.58 MHz quadrature demodulating carrier signals as part of a phase locked loop with feedback from the R-Y signal in a manner to be described in more detail below. The first and second mixers 60 and 70 and the first and second LPFs 62 and 72 operate to extract the color difference signals B-Y and R-Y from the chrominance signal C. In the illustrated embodiment, LPFs 62 and 72 each contain a horizontal analog LPF and a low pass line comb filter to satisfy the filtering requirements of both the NTSC and VHS color systems. One skilled in the art of television circuit design will understand how to construct such LPFs. The luminance (Y) signal from the first multiplexer 20, and the demodulated baseband color difference signals B-Y and R-Y from the first and second LPFs 62 and 72, respectively, are all decoded by the color signal matrix 40, and the color signals R, G, and B are supplied to the color image display device (not shown) which displays the image represented by the received broadcast composite video signal, also in a known manner.

If the user elects instead to watch the image representing the playback video signal from a previously recorded video cassette tape, the user control circuit 1 conditions the first multiplexer 20 to couple the luminance signal Y from the playback luminance signal demodulator 80 to its output terminal, conditions the second multiplexer 30 to couple the color-under signal C/U from the playback C/U BPF 90 to its output terminal, and conditions the third multiplexer to couple the 629 kHz 4-phase quadrature demodulating carrier signals to the quadrature demodulator 154.

In this configuration, the VHS color-under signal C/U, 4-phase quadrature modulated on a 629 kHz carrier, and the corresponding 629 kHz 4-phase quadrature demodulating carrier signals, are supplied to respective input terminals of the first and second 60 and 70 within the demodulator 154. The frequency of the 629 kHz demodulating carrier signals is maintained by the DCC timing circuit 100 in response to synchronization signals from the sync separator 50, and the phase of the 629 kHz demodulating carrier signals is maintained by the DCC timing circuit 100 as part of a phase locked loop with feedback from the R-Y signal, all in a manner to be described in more detail below. The first and second mixers 60 and 70 and the first and second LPFs 62 and 72 operate in a known manner to extract the color difference signals B-Y and R-Y from the color-under signal C/U. The remainder of the illustrated circuit operates as described above.

If the user elects instead to record a received broadcast video signal onto a video cassette tape, the user control circuit 1 conditions the respective first, second, and third multiplexers 20, 30, and 110 to process the received broadcast video signal, and the illustrated circuitry operates to generate a baseband luminance signal Y, and baseband color difference signals B-Y and R-Y, all as described above. In this configuration, however, the color-under signal generator 120 operates to produce a 4-phase quadrature modulated color-under signal C/U in a manner described in more detail below. The resulting luminance signal Y and color-under signal C/U is supplied to the record circuit, which processes these signals and records them onto the video cassette tape.

Figure 2:
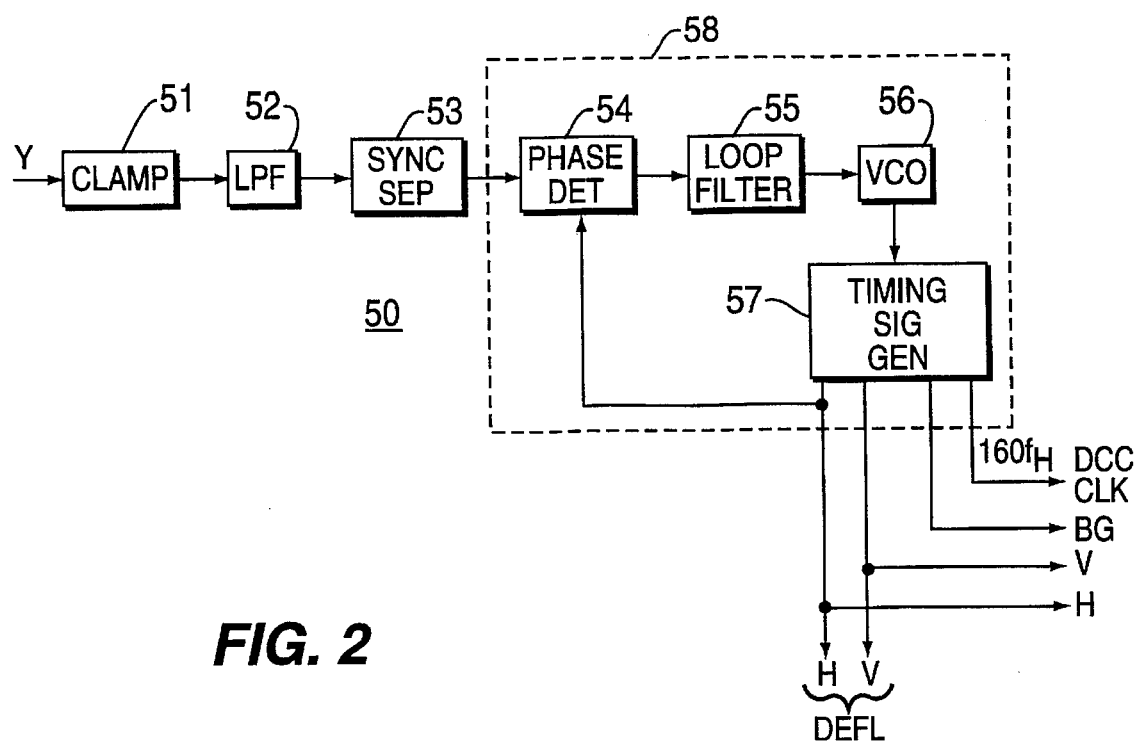
FIG. 2 is a block diagram of a sync detector and timing signal generator for use by a chrominance signal processor of the invention.

FIG. 2 is a block diagram illustrating a sync separator 50 for use within a dual chrominance signal processor of the invention. In FIG. 2, the luminance signal Y from multiplexer 20 (of FIG. 1) is coupled to a first input terminal of a phase detector 54 through the series connection of a clamp 51, low pass filter (LPF) 52, and synchronization signal separator 53. An output terminal of the phase detector 54 is coupled to a control input terminal of a voltage controlled oscillator (VCO) 56 through a loop filter 55. An output terminal of the VCO 56 is coupled to an input terminal of a timing signal generator 57. Timing signal generator 57 has a plurality of output terminals producing respective timing signals. A first output terminal of the timing signal generator 57, producing a horizontal sync signal H at the horizontal frequency $f_H$, is coupled to a second input terminal of the phase detector 54. The combination of the phase detector 54, loop filter 56, VCO 56 and timing signal generator 57 forms a phase locked loop 58. The timing signals illustrated in FIG. 2 are supplied to the DCC timing circuit 100 (of FIG. 1).

In operation, the combination of the clamp 51, LPF 52 and sync separator 53 extracts the synchronization component signal from the selected luminance signal Y (i.e., from either the broadcast video signal or the playback video signal) in a known manner. The phase locked loop 58 generates a plurality of timing signals all synchronized to that synchronization component signal. As described above, the first output terminal of the timing signal generator 57 produces a horizontal sync signal H at the horizontal synchronization frequency $f_H$. The timing signal generator 57 also produces a vertical sync signal V at the vertical synchronization frequency $f_V$, a burst gate signal BG synchronized to the color burst period in the horizontal blanking period, and a DCC clock signal at 160 $f_H$, all in a known manner. The horizontal H and vertical V sync signals are further supplied to deflection circuitry, as described above. In the illustrated embodiment, the VCO can oscillate at the nominal frequency of the DCC clock, 160 $f_H$, or at some multiple of that frequency, e.g. 640 $f_H$.

Figure 3:
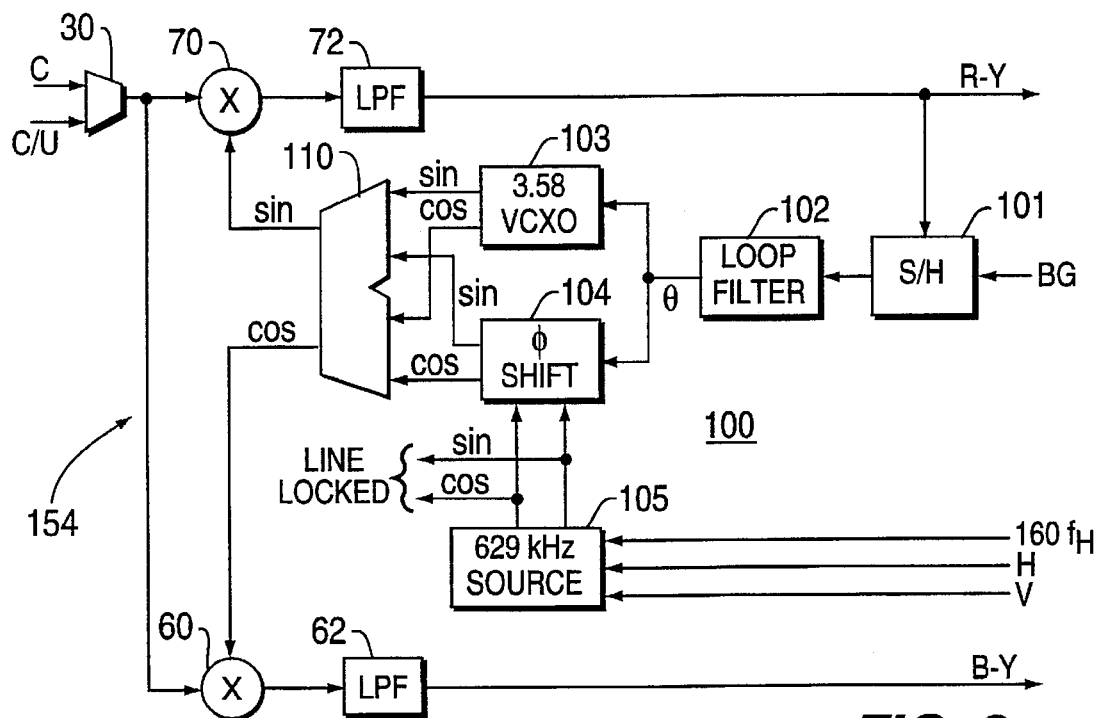
FIG. 3 is a block diagram of a direct chrominance converter of the invention.

FIG. 3 is a block diagram of a portion of the direct chrominance converter 152. In FIG. 3, elements which have been illustrated in FIG. 1 have the same reference numbers, and will not be described in detail below. In FIG. 3, the 160 $f_H$ timing signal, the horizontal sync signal H, and the vertical sync signal V from the timing signal generator 57 (of FIG. 2) are supplied to respective input terminals of a 629 kHz signal source 105. The 629 kHz signal source 105 produces a pair of 629 kHz 4-phase quadrature signals, labeled sin and cos, at respective output terminals. The respective output terminals of the 629 kHz signal source 105 are coupled to corresponding input terminals of a phase shifter 104.

The baseband color difference signal R-Y from LPF 72 is coupled to a signal input terminal of a sample-and-hold (S/H) circuit 101. The burst gate signal BG from the timing signal generator 57 (of FIG. 2) is coupled to a control input terminal of S/H 101. An output terminal of S/H 101 is coupled to an input terminal of a loop filter 102. An output terminal of the loop filter 102 is coupled to respective control input terminals of a 3.58 MHz voltage controlled crystal oscillator (VCXO) 103 and the phase shifter 104. The VCXO 103 produces a pair of phase controlled 3.58 MHz quadrature demodulating carrier signals, labeled sin and cos, at respective output terminals. The respective output terminals of the VCXO 103 are coupled to a corresponding first pair of input terminals of the multiplexer 110. Similarly, the phase shifter 104 produces a pair of phase controlled 629 kHz 4-phase quadrature demodulating carrier signals, also labeled sin and cos, at respective output terminals. The respective output terminals of the phase shifter 104 are coupled to a corresponding second pair of input terminals of the multiplexer 110.

In operation, the 629 kHz 4-phase quadrature signals from the 629 kHz signal source 105 are synchronized to the horizontal sync signal H of the selected video signal (either broadcast or playback), in a manner described in more detail below, and are termed line-locked. The multiplexer 30 selects either the broadcast 3.58 MHz quadrature modulated chrominance signal C or the playback 629 kHz 4-phase quadrature modulated color-under signal C/U to be processed by the quadrature demodulator 154, i.e., by the mixers 60 and 70 and the LPFs 62 and 72. Multiplexer 110 simultaneously supplies the appropriate quadrature demodulating carrier signals to mixers 60 and 70. The quadrature demodulator 154 processes the input chrominance or color-under signal from multiplexer 30 to produce the respective color difference signals B-Y and R-Y.

As is known, a color burst having the -(B-Y) phase is inserted into the horizontal blanking period during a burst period, and the burst gate signal BG is synchronized to the burst period. If the quadrature demodulating carrier signals supplied to the respective mixers 60 and 70 are phased properly, the level of the R-Y component during the burst period is zero. The S/H 101 is triggered by the burst gate signal BG to sample and average the level of the R-Y signal during the burst period. The S/H 101 produces a signal representing the average level of the R-Y color difference signal during the burst period. This signal is processed by the loop filter 102 to produce an error signal e representing the deviation of the R-Y component from zero level during the burst period. The error signal e is supplied to the respective control input terminals of both the 3.58 MHz VCXO 103 and the phase shifter 104. The phase of the quadrature demodulating carrier signals produced by the VCXO 103 and phase shifter 104 is controlled in response to the error signal e in such a manner as to attempt to return the level of the R-Y color difference signal during the burst period to zero.

The sin phase demodulating carrier signals from both the VCXO 103 and the phase shifter 104 are supplied to respective first and second input terminals of a first section of the multiplexer 110, and the cos phase demodulating carrier signals from both the VCXO 103 and the phase shifter 104 are supplied to respective first and second input terminals of a second section of the multiplexer 110. The first section of multiplexer 110 couples one of the sin phase demodulating carrier signals to the mixer 70, and the second section couples one of the cos phase demodulating carrier signals to the mixer 60. The first and second sections cooperate to couple the quadrature demodulating carrier signals from the VCXO 103 to the mixers 60 and 70 when the broadcast chrominance signal C is being processed, and to couple the 4-phase quadrature demodulating carrier signals from the phase shifter 104 to the mixers 60 and 70 when the playback color-under signal C/U is being processed, in response to the control signal received from the user control circuit 1.

Figure 4:
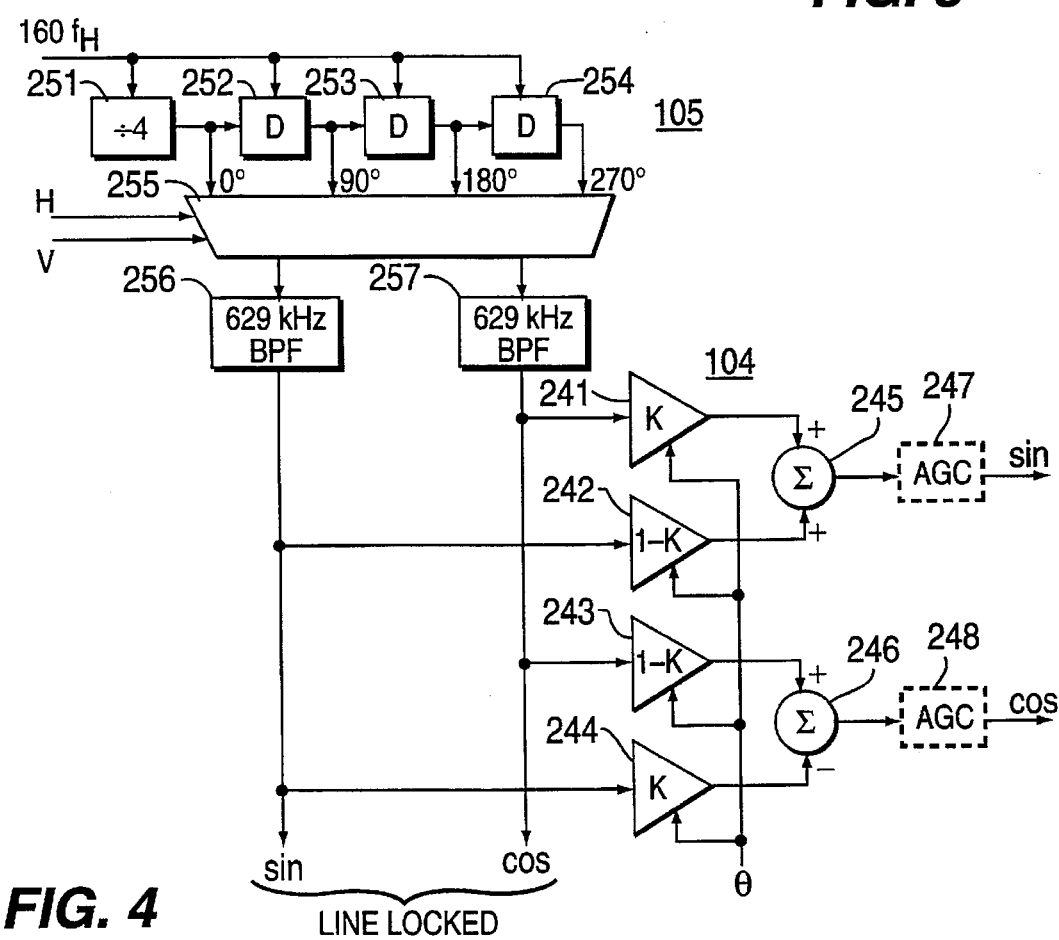
FIG. 4 is a block diagram of a color-under demodulating carrier signal generator for use in a chrominance signal processor of the invention.

FIG. 4 is a block diagram of a color-under demodulating carrier signal generator for use in a chrominance signal processor of the invention. In FIG. 4, the 160 $f_H$ timing signal from the timing signal generator 57 (of FIG. 2) is coupled to respective input terminals of a divide-by-four circuit 251, and delay circuits 252, 253, and 254. Respective output terminals of the divide-by-four circuit 251 and the delay circuits 252, 253, and 254 are coupled to corresponding signal input terminals of a signal selector 255. The horizontal sync signal H and the vertical sync signal V from timing signal generator 57 are coupled to timing signal input terminals of the signal selector 255. First and second output terminals of the signal selector 255 are coupled to respective input terminals of first and second 629 kHz bandpass filters (BPF) 256 and 257. Respective output terminals of the first and second BPFs 256 and 257 produce the line-locked 4-phase quadrature signals: the first BPF 256 producing the sin phase line-locked 4-phase signal, and the second BPF 257 producing the cos phase line-locked 4-phase signal. The combination of the divide-by-four circuit 251, the delay circuits 252, 253, and 254, the signal selector 255 and the first and second BPFs form the 629 kHz signal source 105.

The output terminals of the first and second BPFs 256 and 257 are further coupled to input terminals of first, second, third and fourth gain control circuits 241, 242, 243, and 244. The output terminal of the first BPF 256 is coupled to respective input terminals of the second and fourth gain control circuits 242 and 244, and the output terminal of the second BPF 257 is coupled to respective input terminals of the first and third gain control circuits 241 and 243. The error signal e from the loop filter 102 (of FIG. 3) is coupled in common to respective control input terminals of the first, second, third, and fourth gain control circuits 241–244. An output terminal of the first gain control circuit 241 is coupled to a first +input terminal of a first summer 245, and an output terminal of the second gain control circuit 242 is coupled to a second +input terminal of the first summer 245. An output terminal of the third gain control circuit 243 is coupled to a +input terminal of a second summer 246 and an output terminal of the fourth gain control circuit 244 is coupled to a −input terminal of the second summer 246. An output terminal of the first summer 245 produces the sin phase of the phase controlled 4-phase quadrature demodulating carrier signals and is coupled to the second input terminal of the first section of the multiplexer 110 (of FIG. 3). An output terminal of the second summer 246 produces the cos phase of the phase controlled 4-phase quadrature demodulating carrier signals and is coupled to the second input terminal of the second section of the multiplexer 110. The combination of the gain control circuits 241–244, and summers 245 and 246 form the phase shifter 104.

In the illustrated embodiment, the 160 $f_H$ signal, the horizontal sync signal H and the vertical sync signal V are all digital clock signals, and the divide-by-four circuit 251, the delay circuits 252, 253 and 254, and the signal selector 255 are all digital circuits. One skilled in the art of digital circuit design will understand how to generate such signals, and how to fabricate, arrange and interconnect such circuit elements. The color-under carrier frequency, 629 kHz, is 40 $f_H$. The divide-by-four circuit 251 produces a 40 $f_H$ signal from the 160 $f_H$ signal. This signal is then delayed by successive periods of the 160 $f_H$ clock signal by the delay circuits 252, 253, and 254. The output of the divide-by-four circuit 251 may be considered a 0 degree phase 40 $f_H$ signal. The output of the first delay circuit 252, which is the 0 degree phase 40 $f_H$ signal delayed by one period of the 160 $f_H$ clock signal, may be considered a 90 degree phase signal; the output of the second delay circuit 253, which is the 0 degree phase signal delayed by two periods of the 160 $f_H$ clock signal, may be considered a 180 degree phase signal; and the output of the third delay circuit 254, which is the 0 degree phase signal delayed by three periods of the 160 $f_H$ clock signal, may be considered a 270 degree phase signal.

On a tape recorded by a VHS VCR, successive transverse tracks, each recording a single field, are recorded by alternating tape heads having different azimuth settings, termed +azimuth and −azimuth heads, all in a known manner. Although not strictly necessary, current VCRs commonly synchronize the tape head wheel to the composite video signal so that, for example, tracks containing odd fields will always be recorded by the −azimuth tape head and tracks containing even fields will always be recorded by the +azimuth tape head. In such VCRs, the vertical sync signal indicates the + or −azimuth of the tape head associated with the coming field. For tracks recorded by the −azimuth tape head, the phase of the modulating carrier signal is delayed by 90 degree each line, and for tracks recorded by the +azimuth tape head, the phase of the modulating carrier signals is advanced by 90 degree each line The signal selector 255 operates to couple two of the four input terminals to its output terminals in the following manner. For tracks recorded by the −azimuth tape head (e.g. odd fields), during line 1 of the raster, the 0 degree phase signal from the divide-by-four circuit 251 is coupled to the second output terminal (i.e. to BPF 257) as the cos phase 629 kHz line-locked 4-phase signal, and the 90 degree phase signal from the first delay circuit 252 is coupled to the first output terminal (i.e. to BPF 256) as the sin phase line-locked 629 kHz 4-phase signal. During line 2, the 90 degree phase signal is coupled to the second output terminal and the 180 degree phase signal is coupled to the first output terminal. Thus, the phase of the line-locked signal generated for line 2 is delayed 90 degrees with respect to that generated for line 1. During line 3, the 180 degree phase signal is coupled to the second output terminal and the 270 degree phase signal is coupled to the first output terminal. And during line 4, the 270 degree phase signal is coupled to the second output terminal and the 0 degree phase signal is coupled to the first output terminal. This 4-phase sequence then repeats for the remainder of the lines in the raster. Thus, the phase of the line-locked signal is delayed 90 degrees from one line to the next, i.e. 0, 90, 180 and 270 degrees. For tracks recorded by the +azimuth tape head (e.g. even fields), the sequence of is reversed so that the phase is advanced 90 degrees from one line to the next, i.e. 0, 270, 180 and 90 degrees, at each of the first and second output terminals. One skilled in the art of digital circuit design will understand how to construct such a signal selector, and synchronize its operation in response to the horizontal sync signal H and the vertical sync signal V (representing the + or −azimuth of the tape head associated with that field).

The remainder of the illustrated circuitry is analog circuitry. The output signals from the first and second BPFs 256 and 257 are line-locked 629 kHz 4-phase analog quadrature sine wave signals. These signals are scaled and combined by the four gain control circuits 241–244 and summers 245 and 246. In the illustrated embodiment, the error signal e is a signal representing a value running from zero to 1. This signal is used in the illustrated embodiment to directly control the value of K in the gain control circuits 241–244, i.e. when e is zero, K is zero, and when e is 1, K is 1. One skilled in the art will understand that a different relationship between the value of the error signal e and the value of K may also be implemented. In general, a pair of gain control circuits controls the relative proportion of the sin phase and cos phase signals combined in the summer associated with that pair of gain control circuits and, thus, controls the phase of the sine wave signal produced by the summer.

Referring to gain control circuits 241 and 242 and summer 245, if K is zero, then the gain of the gain control circuit 241 is zero and the level of the cos phase signal (from BPF 257) supplied to the first input terminal of the summer 245 is zero. However, the gain of the gain control circuit 242 is 1 and the full level of the sin phase signal (from BPF 256) is supplied to the second input terminal of the summer 245. The output of the summer 245 in this condition is the sin phase signal with no phase shift. If K is 1, then the gain of the first gain control circuit 241 is 1 and the full level of the cos phase signal is supplied to the first input terminal of the summer 245. But the gain of the second gain control circuit 242 is zero and the level of the sin phase signal supplied to the second input terminal of the summer 245 is zero. The output of the summer 245 in this condition is the cos phase signal, or the sin phase signal shifted in phase by 90 degrees. If K is 0.5, the gain of both the first and second gain control circuits 241 and 242 is 0.5 and the level of both the sin phase signal and the cos phase signal supplied to the respective input terminals of the summer 245 is 0.5 times their full level. The output of the summer 245 in this condition is a sine wave signal having a phase half way between the phase of the sin phase signal and the cos phase signal, or the sin phase signal shifted in phase by 45 degrees. The phase of the output signal from the summer 245, i.e. the 629 kHz sin phase 4-phase demodulating carrier signal, is, thus, controlled by the value of K, which in turn is related to the value of the error signal e. Gain control circuits 243 and 244, and summer 246 operate in a similar manner to control the phase of the 629 kHz cos phase 4-phase demodulating carrier signal in response to the error signal e.

One skilled in the art will understand that while the arrangement described above will produce 629 kHz phase controlled 4-phase quadrature sine wave demodulating carrier signals, the amplitude of these carrier signals will vary as the phase is adjusted. This amplitude variation may be corrected in a variety of ways. For example, the relationship of the value of K to that of the error signal e may be controlled so as to maintain a constant amplitude output signal from the summers 245 and 246 as the phase of their output signals is adjusted, as described above. A different way is illustrated in phantom in FIG. 4. In FIG. 4, known first and second automatic gain control (AGC) circuits 247 and 248 are coupled to respective output terminals of the first and second summers 245 and 246. The first and second AGCs 247 and 248 operate in a known manner to maintain the level of their output signals at a constant level.

As described above, when the user elects to record a received broadcast video signal onto a video cassette tape, the circuitry illustrated in FIG. 1 operates to process the signal from the broadcast video signal source. However, in this case, the color-under signal generator 120 operates to generate the color-under signal C/U for recording on the video cassette tape. FIG. 5 is a block diagram of a first embodiment of the color-under signal generator 120 for use in the record mode of a TV/VCR of the invention. In FIG. 5, the R-Y baseband color difference signal from LPF 72 (of FIG. 1) is coupled to a first input terminal of a mixer 221. An output terminal of the mixer 221 is coupled to a first input terminal of an adder 223. An output terminal of the adder 223 produces the record color-under signal C/U, which is supplied to recording circuitry. The B-Y baseband color difference signal from LPF 62 (of FIG. 1) is coupled to a first input terminal of a second mixer 222. An output terminal of the second mixer 222 is coupled to a second input terminal of the adder 223. The sin phase 629 kHz line-locked 4-phase signal from BPF 256 (of FIG. 4), labeled sin, is coupled to a second input terminal of the first mixer, and the cos phase 629 kHz line-locked 4-phase signal from BPF 257, labeled cos, is coupled to a second input terminal of the second mixer 222.

In operation, the baseband color difference signals R-Y and B-Y are modulated onto the appropriate one of the line-locked quadrature signals, sin and cos, respectively by mixers 221 and 222. The resulting modulated signals are combined in adder 223 to produce the color-under signal C/U representing the baseband color difference signals extracted from the received broadcast video signal.

FIG. 6 is a block diagram of a second embodiment of the color-under signal generator 120 for use in the record mode of a TV/VCR system. In FIG. 6, the sin phase signal from the 3.58 MHz VCXO 103 (of FIG. 3) is coupled to a first input terminal of a first mixer 224, and the sin phase 629 kHz 4-phase line-locked signal from the 629 kHz signal source 105 (of FIG. 3) is coupled to a second input terminal of the first mixer 224. An output terminal of the mixer 224 is coupled to an input terminal of a 4.2 MHz bandpass filter (BPF) 225. An output terminal of the BPF 225 is coupled to a first input terminal of a second mixer 226. The received broadcast chrominance signal C from the Y/C separator 10 (of FIG. 1) is coupled to a second input terminal of the second mixer 226, as shown in phantom in FIG. 1. An output terminal of the second mixer 226 is coupled to an input terminal of a low pass filter (LPF) 227. An output terminal of the LPF 227 produces the record color-under signal C/U, which is supplied to recording circuitry.

In operation, the combination of the first mixer 224 and 4.2 MHz BPF 225 operates in a known manner to upconvert the sin phase 629 kHz 4-phase line-locked signal to approximately 4.2 MHz. The combination of the second mixer 226 and the LPF 227 operates, also in a known manner, to both downconvert the 3.58 MHz chrominance signal C to 629 kHz and simultaneously to modulate that signal onto a 4-phase carrier signal. The resulting modulated signal is the color-under signal C/U representing the chrominance signal C extracted from the received broadcast video signal.

The invention has been described above as implemented in a combination of a TV receiver for processing a broadcast video signal in the NTSC format, and a VCR for processing a record or playback signal in the VHS format. One skilled in the art of video system design will understand that the invention may also be used in combination TV/VCR including a TV receiver processing other composite video signal formats, such as PAL and SECAM, and a VCR processing other record and playback formats, such as Beta or 8 millimeter (mm).

A TV/VCR combination of the invention shares as much chrominance signal processing circuitry between the broadcast mode and the playback mode as is possible. Only the luminance/chrominance separating circuitry, and the demodulating carrier generating circuitry is duplicated, due to the different formats and frequencies of the broadcast and playback composite video signals. The remainder of the chrominance processing circuitry is shared by the use of multiplexers. This results in lower cost (both of parts and manufacturing) due to the use of shared circuitry, and to increased reliability by reducing the number of parts which can fail.

We claim:

1. A dual chrominance signal processor for processing first and second modulated chrominance signals, comprising:

first and second demodulating carrier signal sources;

a first signal selector, coupled to said first and second demodulating carrier signal sources for selectively coupling one of the first and second demodulating carrier signal sources, to a first signal selector output terminal response to a selection signal; and a second signal selector for selectively coupling one of the first and second chrominance signals to a second signal selector output terminal in response to said selection signal; and a quadrature demodulator, coupled to said first and second signal selector output terminals, responsive to a selected chrominance signal and a selected demodulating carrier signal, for demodulating the chrominance signal.

2. The processor of claim 1 wherein said second demodulating carrier signal source is frequency locked to said first demodulating carrier signal source.

3. The processor of claim 1 wherein the first and second modulated chrominance signals have respectively different signal formats.

4. The processor of claim 3 wherein the first modulated chrominance signal is a broadcast format modulated chrominance signal and the second modulated chrominance signal is a play back color-under format modulated chrominance signal.

5. In a combined television receiver and video cassette recorder, a chrominance signal processor for processing both a broadcast chrominance signal and a color-under chrominance signal, comprising:

a broadcast demodulating carrier signal source;

a color-under demodulating carrier signal source;

a demodulator, responsive to a selected chrominance signal and a selected demodulating carrier signal, for demodulating the chrominance signal; and a signal selector, coupled to the demodulating carrier signal sources, for selectively coupling one of the broadcast modulated chrominance signal source and the color-under modulated chrominance signals, and the corresponding one of the broadcast demodulating carrier signal source and the color-under demodulating carrier signal source, to the demodulator in response to a selection signal.

6. The processor of claim 5 further comprising a synchronization circuit for extracting horizontal and vertical synchronization signals from a luminance signal and wherein said color-under demodulating carrier signal source is line-locked to said horizontal synchronization signal.

7. The processor of claim 5 further comprising a color-under chrominance record signal generator for generating a modulated color-under chrominance record signal corresponding to the modulated broadcast chrominance signal.

8. The processor of claim 7 further comprising:

a source of a broadcast composite video signal; and a chrominance signal separator, coupled to the broadcast composite video signal source, for extracting the modulated broadcast chrominance signal from the broadcast composite video signal, where the demodulator produces a baseband color representative signal corresponding to the modulated broadcast chrominance signal;

a source of a color-under modulating carrier signal line-locked to the broadcast video signal; and a modulator, coupled to the line-locked color-under modulating carrier signal source and the demodulator, for modulating the baseband color representative signal on the line-locked color-under modulating carrier signal to produce the modulated color-under chrominance record signal.

9. The processor of claim 5 further comprising:

a source of a broadcast composite video signal; and a chrominance signal separator, coupled to the broadcast composite video signal source, for extracting the modulated broadcast chrominance signal from the broadcast composite video signal; and a source of a color-under carrier signal line-locked to the broadcast composite video signal;

an upconverter, coupled to the line-locked color-under carrier signal source and the broadcast demodulating carrier signal source, for upconverting the color-under carrier signal; and a downconverter, coupled to the chrominance signal separator and the upconverter, for generating the color-under chrominance record signal.

\* \* \* \* \*